United States Patent [19]

Pelet et al.

[11] E Re. 30,827

[45] Reissued Dec. 22, 1981

[54] PROCESS AND DEVICE FOR THE DETERMINATION OF THE CHARACTERISTICS OF THE GEOLOGICAL FORMATIONS TRAVERSED BY A BOREHOLE

[75] Inventors: Regis Pelet, Le Pecq; Pierre Morlier, Paris; Jean-Paul Sarda; Jean-Francois Bard, both of Rueil-Malmaison, all of France

[73] Assignee: Institut Francais du Petrole, Rueil-Malmaison, France

[21] Appl. No.: 889,623

[22] Filed: Mar. 23, 1978

Related U.S. Patent Documents

Reissue of:

[64] Patent No.: 3,990,297
Issued: Nov. 9, 1976
Appl. No.: 472,498
Filed: May 22, 1974

U.S. Applications:

[63] Continuation-in-part of Ser. No. 129,534, Mar. 30, 1971, abandoned.

[51] Int. Cl.[3] ..... E21B 49/00

[52] U.S. Cl. ..... 73/152; 250/256

[58] Field of Search ..... 73/151, 152; 250/256, 250/261, 262, 268, 269, 270, 265; 181/102, 104

[56] References Cited

U.S. PATENT DOCUMENTS

| | | | |
|---|---|---|---|
| Re. 24,226 | 10/1956 | Fearon | 250/256 |
| 2,760,078 | 8/1956 | Youmans | 250/256 X |
| 3,521,064 | 7/1970 | Moran et al. | 250/261 |

*Primary Examiner*—Jerry W. Myracle
*Attorney, Agent, or Firm*—Craig & Antonelli

[57] ABSTRACT

Process for determining characteristics of the geological formations traversed by a borehole, making use of a sonde by means of which the intensity of the $\gamma$ rays naturally radiated from the formations is measured, both longitudinal and transversal acoustic waves are transmitted to the formations, their travel time and their attenuation between two receivers placed in contact with the formations are measured and by combination of the so-obtained values a resulting value is elaborated which is representative of one characteristic of the surveyed formations.

30 Claims, 13 Drawing Figures

(GF = FUNCTION GEN)

PROCESS AND DEVICE FOR THE DETERMINATION OF THE CHARACTERISTICS OF THE GEOLOGICAL FORMATIONS TRAVERSED BY A BOREHOLE

Matter enclosed in heavy brackets [ ] appears in the original patent but forms no part of this reissue specification; matter printed in italics indicates the additions made by reissue.

This application is a continuation-in-part of Ser. No. 129,534 filed Mar. 30, 1971 and now abandoned.

The present invention relates to a process and to a device for determining the characteristics of the geological formations traversed by a borehole, these characteristics consisting particularly of the lithology, and possibly *other petrophysical characteristics such as* the porosity and permeability of the formations.

Within the framework of the following description, the lithology of the geological formations is intended to include the following data:

the clay content (i.e., the entirety of the argillaceous minerals expressed in percent;

the carbonate content (calcite, dolomite, aragonite, siderite), expressed in percent;

the quartz content expressed in percent;

the cationic exchange capacity (or CEC), expressed in milliequivalent per 100 grams of rock. (This value is representative of the behavior of the clays of the formation being subjected to a change in the ionic composition of the fluids which impregnated the same, and due for example to the drilling.)

It is an object of the present invention to determine the lithology of geological formations traversed by a borehole on the basis of measurements carried out by so-called radioactive logging processes, such as the $\gamma$ logging.

The method according to the present invention for determining characteristics of the geological formations traversed by a borehole, using a measuring sonde in combination with an automatic system for treating the data furnished by the sonde, is characterized in that it comprises in combination the following steps:

a. determining of the natural $\gamma$ radiation spectrum emitted by the geological formations in the form of a plurality of quantities related to this radiation, and each of which is a function of the intensity of this natural radiation in a given energy band, and b. elaborating on the basis of these quantities by means of the aforementioned automatic system at least one resultant quantity representative of one characteristic of these formations, this resultant quantity being obtained by a linear combination of these quantities related to the $\gamma$ radiation.

These quantities related to the $\gamma$ radiation will, for example, be electric signals and the aforementioned resultant quantity will be an electric signal representative of the lithology of the geological formations such as defined previously.

The device for carrying out the process of the present invention, using a sonde in combination with a surface apparatus for the automatic treatment of the data furnished by the sonde, the sonde and the apparatus being connected by a cable equipped with electrical conductors, is characterized in that the sonde comprises means for detecting the natural $\gamma$ radiation emitted by the geological formations, and these means deliver electric signals related to the $\gamma$ radiation emitted by the geological formations, and each of which is a function of the intensity of this natural radiation in a given energy band, and means for transmitting these electric signals to the surface.

It is another object of the present invention to simultaneously determine an entire group of characteristics of the geological formations comprising, in addition to the lithology, the porosity, and the permeability of the geological formations traversed by a borehole.

It is possible to determine certain characteristics of the formations traversed by a borehole by using known so-called radioactive logging processes, such as the $\gamma$ logging, or so-called acoustic loggings.

In the acoustic logging processes according to the prior art, acoustic wave trains are emitted, and if it is desired to distinguish between the longitudinal and transverse modes of propagation of these acoustic waves, it is necessary to carry out special treatments of the data collected with the aid of complex apparatus with the obtained results being of doubtful accuracy.

Moreover, in order to determine the characteristics of formations traversed by a borehole, it is often necessary, according to the prior art, to establish several loggings for each of the known processes, each of these loggings requiring a rather significant amount of time to be worked out, and the drilling operation being stopped during the periods of measurement which thus represent a nonnegligible loss of time and then it is necessary to make a critical evaluation of all the results obtained by these loggings.

The process according to the present invention for overcoming the above-mentioned drawbacks and for simultaneously determining an entire group of characteristics of geological formations traversed by a borehole by using in combination a measuring sonde and an automatic system for treating the data furnished by the sonde. This process is characterized in that it comprises in combination the following steps:

a. determination of the natural $\gamma$ radiation spectrum emitted by the geological formations in the form of a plurality of quantities related to this radiation and each of which is a function of the intensity of this natural radiation in a given energy band, b. alternative transmission of acoustic waves being propagated in the geological formations essentially according to the longitudinal way or mode and acoustic waves being propagated essentially according to the transversal way or mode, c. successive determination of the travel time of these longitudinal waves and these transversal waves between two receivers placed in contact with the geological formations, by producing two quantities related to this travel time for the longitudinal and for the transversal waves respectively, d. successive determination between these receivers of the attenuation of these longitudinal and these transversal waves by producing two quantities representative of this attenuation for the longitudinal waves and the transversal waves, respectively, and e. elaboration on the basis of these quantities in the automatic system of at least one resultant quantity representative of one characteristic of the formation, this quantity being obtained by a linear combination of the quantities related to the $\gamma$ radiation with the quantities related to the travel time of the longitudinal and transversal acoustic waves, and with the quantities related to the attenuations of these acoustic waves.

More particularly, a precise identification of the geological formations is obtained according to the present invention by:

a $\gamma$ spectrometry for obtaining accurate data concerning the clay content, less accurate data relating to the content of carbonates and the cationic exchange capacity, and not very accurate data relating to the quartz content, and acoustic meansurements which furnish by a comparison of the respective travel times of the waves being propagated essentially longitudinally and of the waves being propagated essentially transversally, accurate data relating to the quartz content, less accurate data relating to the content of carbonates and not very accurate data relating to the clay content.

The knowledge of the clay content, obtained by $\gamma$ spectrometry permits the determination, on the one hand, of the porosity of the geological formations based on the knowledge of the acoustic waves travel time (particularly the longitudinal waves) and, on the other hand, based on the knowledge of the attenuation of the acoustic waves (particularly the transversal waves), of the mobility of the fluids inside the geological formation and accordingly, of the permeability of the geological formations, which is the product of the mobility by the viscosity of the fluid impregnating the formations, the viscosity being assumed to be constant with a rather good accuracy.

The error in the measurement of the permeability is in fact substantial only in the cases where the formations at the place of measurement, consist of:

dry rocks saturated with gas at low depth, and oil-wet rocks saturated with viscous oil at low depth.

In the first case, a gas flow will be observed and it will be apparent that the presence of this gas will explain the apparently high permeability shown by the measurements.

In the second case, the interpretation may be made with certainty if the formation exhibits a high porosity and a low clay content, a combination which does not allow for the low permeability values indicated by the measurements.

The case where a viscous oil impregnates a very porous or very clayish formation is both very unusual and of little economical interest.

A device usable for carrying out the process according to the present invention such as indicated hereinabove comprises a sonde which is connected, by means of a cable equipped with electric conductors, to a surface apparatus for the automatic treatment of data being furnished by the sonde, and this device is characterized in that the sonde comprises in combination the following elements:

a. means for detecting the natural $\gamma$ radiation emitted by the formations, these means furnishing electric signals which are representative of the $\gamma$ radiation emitted by the geological formations, each of these signals being a function of the intensity of this natural radiation in a given energy band, b. first acoustic wave emitting means for emitting or transmitting in the geological formations acoustic waves propagated essentially according to the longitudinal mode, c. second acoustic wave emitting or transmitting means for emitting in the geological formations acoustic waves propagated essentially according to the transversal mode, the first and second emitting means operating alternatively, d. at least two receivers of acoustic waves for delivering electric signals in response to the reception of the acoustic waves, e. means for determining the travel time and the attenuation between these receivers of these acoustic waves, these means being connected with the receivers and adapted to deliver a first series of electric signals representative of the attenuation of the acoustic waves, and f. means for transmitting to the surface all of the electric signals.

The invention will be better understood and further advantages thereof made apparent from the following description of an embodiment of the invention, given by way of nonlimitative example and illustrated by the accompanying drawings wherein:

FIG. 1 illustrates schematically the entire inventive device for carrying out the process proposed by the present invention designed for the exploration of geological formations traversed by a borehole.

Figure 1:
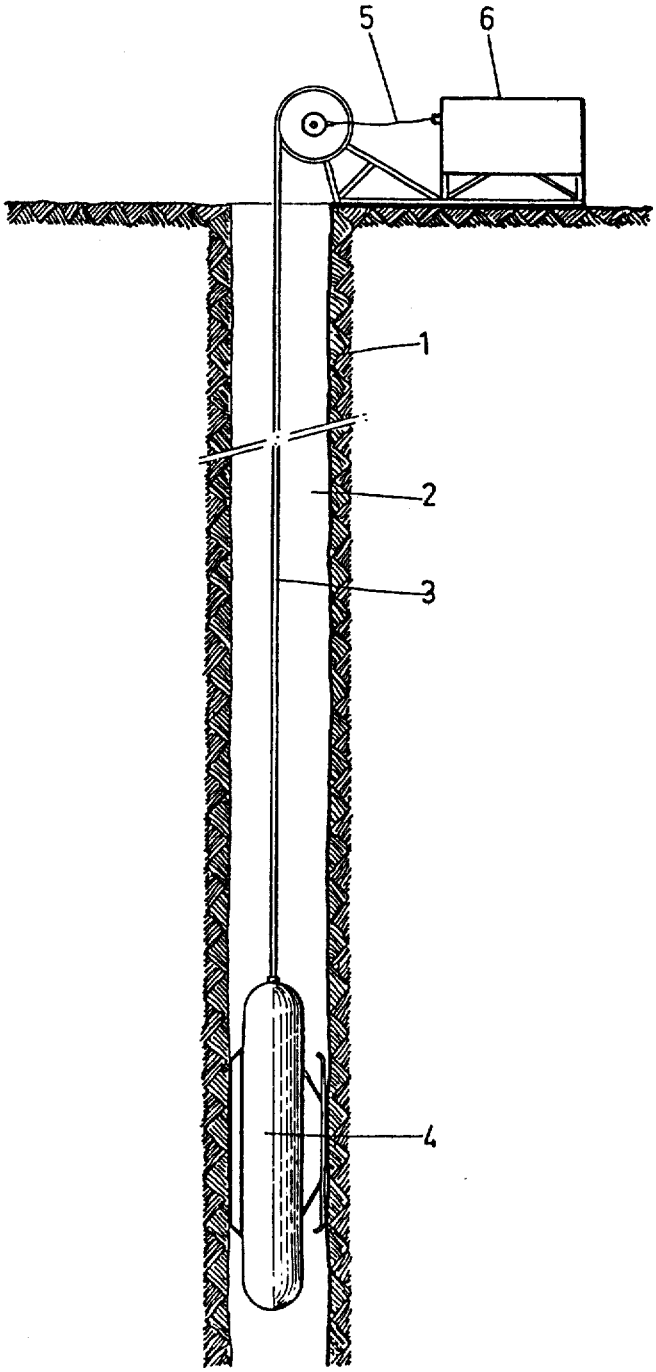
FIG. 1 illustrates the assembly of the device according to the invention, used for surveying formations traversed by a borehole.

In this figure, reference numeral 1 designates geological formations traversed by a borehole 2. Suspended from an operating cable 3, a sonde 4 is displaced in the borehole. The cable 3 comprises a plurality of electrical conductors connected by conductors 5 to a surface apparatus 6. This apparatus, which will be described in further detail hereinafter is designed for supplying the sonde 4 with electric energy and for treating the data being delivered by the sonde through the conductors of the cable 3.

Figure 2:
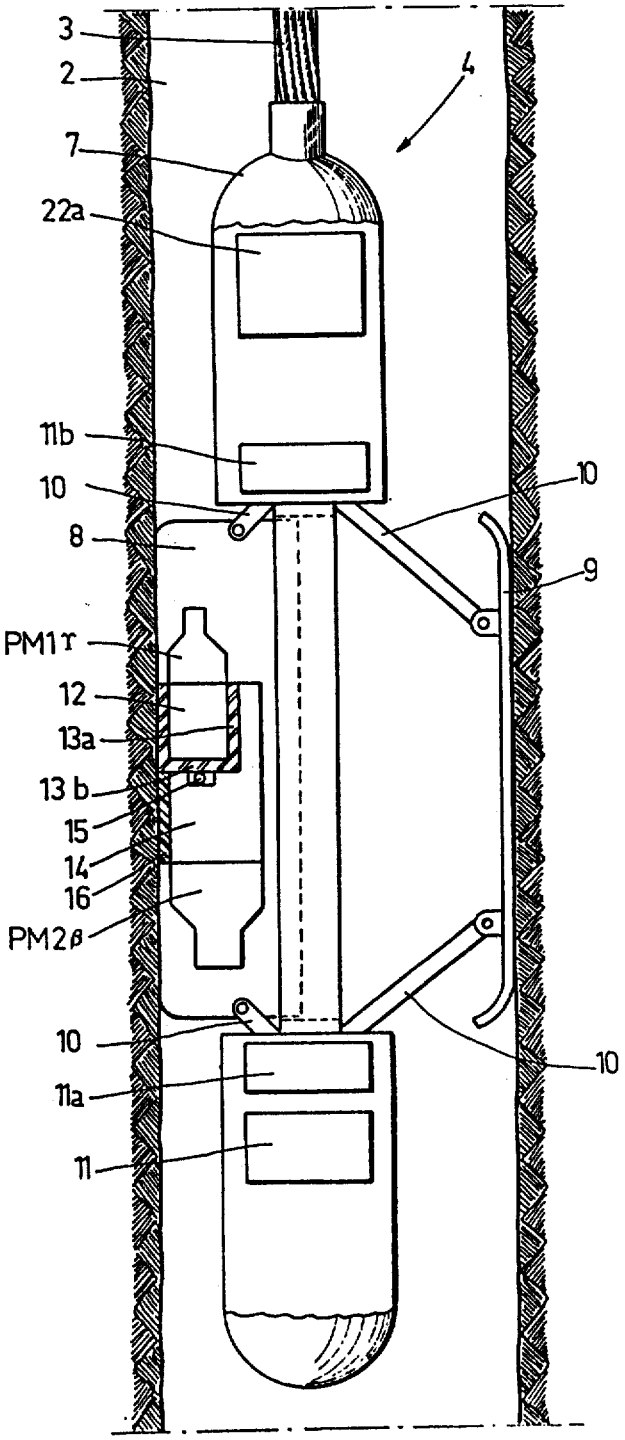
FIG. 2 illustrates a particular embodiment of the sonde forming part of the equipment of the device shown in FIG. 1.

FIG. 2 represents schematically a first particular embodiment of the sonde 4 which permits the determination of the lithology of the geological formations.

The body 7 of the sonde which has, for example, a diameter in the order of 110 millimeters is rigid. It is hollowed out in the central part thereof in order to receive two articulated pads or guide blocks 8 and 9. These pads or guide blocks are actuated by means of articulated arms 10 which are controlled by any means known, for example by hydraulic devices 11a and 11b, and these two pads or guide blocks are in contact—in the measuring position of the sonde—with two diametrically opposite generatrices of the borehole 2. A device 11 which is connected with the hydraulic means 11a and 11b allows for measuring the spacing of the guide blocks and supplies electric pulses having a low frequency, for example 1 Hz, and being coded as function of the value of the average diameter of the borehole opposite the guide blocks. These pulses are transmitted to the surface by a conductor (not shown) which is embedded in the cable 3 from which the sonde is suspended. As shown in FIG. 2, the guide block 9 has a purely mechanical role, and the displacement thereof in a direction perpendicular to the borehole axis is greater than that of the guide block 8.

The guide block 8 which, in the measuring position represented in FIG. 2, comes into contact with the wall of the borehole, comprises a $\gamma$ logging device. This device may be of any known type, but according to the preferred embodiment of the present invention, it contains means for stabilizing the $\gamma$ spectrum emitted by the geological formations. This device may, for example, be that described in the French patent 2,077,483 filed on Jan. 20, 1970. This device comprises a scintillator 12, for example of the type with sodium iodide crystal, which is associated in a known manner with a photomultiplier PM1 $\gamma$ and which has a casing 13a made of a material absorbing the $\gamma$ rays only to a small extent such as aluminum. Under this assembly is placed a $\beta$ ray detector comprising in a manner known per se a scintillator 14 associated with a photomultiplier PM2$\beta$. Arranged between the scintillators 12 and 14 is an auxiliary source of $\gamma$ rays designated with reference numeral 15 which is at the same time a source of $\gamma$ rays, this source consisting for example, and preferably, of a 22 sodium ($^{22}$Na) pellet.

The scintillator 14 is shielded on the lateral wall thereof by a layer 16 of a material which strongly absorbs the $\gamma$ rays, such as lead, and the auxiliary source 15 is separated from the scintillator 12 by a sheet 13b of a material forming an optical screen between the two scintillators and stopping those of the $\beta$ rays which would be directed toward the scintillator 12. This sheet may consist for example of aluminum which does not materially absorb the $\gamma$ pulses being emitted by the auxiliary source 15. The thickness of this sheet will be chosen in accordance with the intensity of the reference $\gamma$ radiation, i.e., in accordance with the activity of the source of 22 sodium ($^{22}$Na) emitting this radiation.

The operation of this device, which has been described in detail in the French patent 2,077,483 and which is not the essential object of the present invention will not be further indicated herein.

It should only be noted that what is obtained iis the stabilization of the natural $\gamma$ spectrum emitted by the formations by making use of the $\gamma$ radiation emitted by the auxiliary source 15, and this radiation is known and identified in the spectrum by its time coincidence with a $\gamma$ radiation which is emitted simultaneously by the auxiliary source 15.

The photomultipliers PM1$_\gamma$ and PM2$_\beta$ are connected to an electronic assembly 22a, contained for example in the body 7 of the sonde 4 (for the sake of greater clarity of this figure, the electrical connections have not been shown).

This assembly which is connected to the surface by means of electrical conductors of the cable 3 comprises the electronic devices for the supply of the photomultipliers and the electronic members for the treatment of the data being delivered or furnished by the photomultipliers prior to their transmission to the surface by the electrical conductors of the cable 3. The data is transmitted to the surface in the form of pulses of constant duration, for example 140$\mu$ and having an amplitude proportional to the energy of the radiations received by the detectors.

The cable 3 which assures the connection between the sonde and the surface is advantageously a cable that is of a type commercially avaiable containing several conductors. One of the conductors is utilized as ground conductor and may be common to all of the electronic apparatus contained in the sonde. Two other conductors serve for feeding the sonde with energy, for example an alternating current of 220 volt at 50 Hz, from which the direct current high voltage and low voltage necessary for the operation of the sonde is produced. Another conductor is used for the transmission of the $\gamma$ spectrometry signals from the sonde toward the surface, and the data furnished by the device 11 (FIG. 2) can be transmitted by another conductor of the cable 3.

During one measuring interval, the sonde thus furnishes to the surface apparatus the following signals:

a. coded pulses representative of the diameter of the borehole at the level of the sonde, and b. $\gamma$ pulses of constant durations the amplitudes of which are proportional to the energy of the $\gamma$ radiation emitted by the formations.

The lithology of the geological formations is obtained by solving equations of the type $$X_j = \Sigma_{i=1}^{i=n} \alpha_{ij} C_i + \beta_j \tag{1}$$

wherein $X_j$ designates one of the following data:

the content in clays the content in carbonates the content in quartz the cationic exchange capacity.

The coefficients $\alpha_{ij}$ and $\beta_j$ are given coefficients varying with the data $X_j$ to be measured. One way of determining these coefficients will be indicated hereunder.

The coefficients $C_i$ are determined by the measurements effected by the sonde. These coefficients are variables, functions of the nature of the formation or terrain representing the contents of n bands A, B, C, D . . . N judiciously chosen in the $\gamma$ spectrum emitted by the geological formations as represented, for example, in FIG. 3 in the case where n=4.

In order not to complicate the surface apparatus excessively, the determination of the coefficients $\alpha_{ij}$ and $\beta_j$ is made by standardization or calibration from measurements carried out, for example in the laboratory, on samples of terrain taken at the time of the drilling.

In a preferred embodiment for carrying out the present invention, these samples will be cored samples, but it is equally possible to use excavated drilling materials if it is known with certainty from which slope they come. Determined on the samples thus taken, for example in the laboratory and with conventional methods, are the values of the quantities $X_j$ (clay content, carbonate content, quartz content and cationic exchange capacity). When carrying out the logging, the values of the variables $C_i$ measured which correspond to the samples taken are noted. The sequence of the values of the coefficients $\alpha_{ij}$ and $\beta_j$ is then determined by the conventional mathematical process of multiple linear regression in a manner well-known in the art.

The n variables $C_1$ to $C_n$ represent the number of $\gamma$ rays recorded during the measurement time (for example during 30 seconds) and having an energy comprised between conveniently selected ranges. In practice, the number n is low, comprised between 3 and 7, and the range of energy explored is extended, for example from 0.1 to 3.5 MeV, and in general at least comprised between 0.4 and 2.7 MeV, at least one of the energy bands being centered advantageously on the value of 1.47 MeV.

Figure 3:
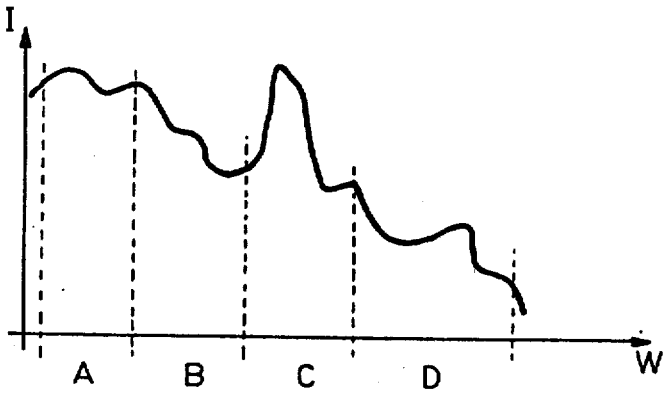
FIG. 3 represents schematically the aspect of the $\gamma$ spectrum emitted by the geological formations.
Figure 4:
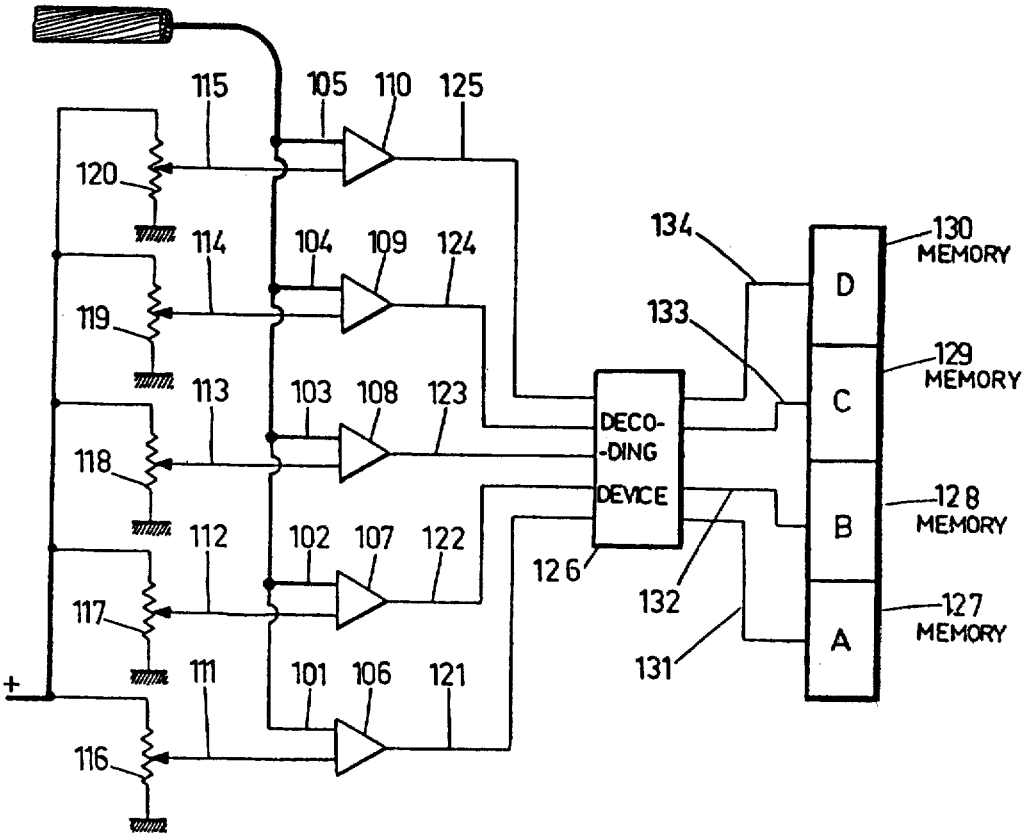
FIG. 4 represents a surface apparatus for the analysis of the $\gamma$ radiation spectrum emitted by the geological formations.

FIG. 4 illustrates an apparatus for the elaboration of the variables $C_i$ in which the number of these variables has been limited to four. The $\gamma$ pulses from the sonde are transmitted simultaneously by conductors 101 to 105 to amplifiers 106 to 110. Applied to the second inputs of the amplifiers are fixed voltages transmitted by the conductors 111 to 115. These voltages are regulable by potentiometers 116 to 120. When an amplifier receives an electric pulse corresponding to a $\gamma$ pulse, it provides on its output terminal either a logical signal of the level 0 when the amplitude of the pulse is lower than the value of the fixed voltage that is applied to this amplifier on the second input terminal thereof, or a logical signal of the level 1 when the amplitude of the pulse is greater than the value of the fixed voltage. For each pulse coming from the sonde, the group of amplifiers furnishes a coded signal transmitted by the conductors 121 to 125 to a decoding device 126 connected to four digital memories 127 to 130 by the conductors 131 to 134. The decoding device 126 provides for the recording of the received signal in the corresponding memory. In this manner, a pulse having for example an amplitude comprised between the voltages furnished by the potentiometers 118 and 119 which delimit the C band of the spectrum places the outputs of the amplifiers 106 to 110 in the configuration 1-1-1-0-0. This combination, analyzed by the device 126 causes the increase of a unit of the memory 129 corresponding to the C band of the $\gamma$ spectrum (FIG. 3). The potentiometers 116 to 120 are regulable so as to be adapted to adjust the limits of the energy bands to the values being best suited.

Figure 5:
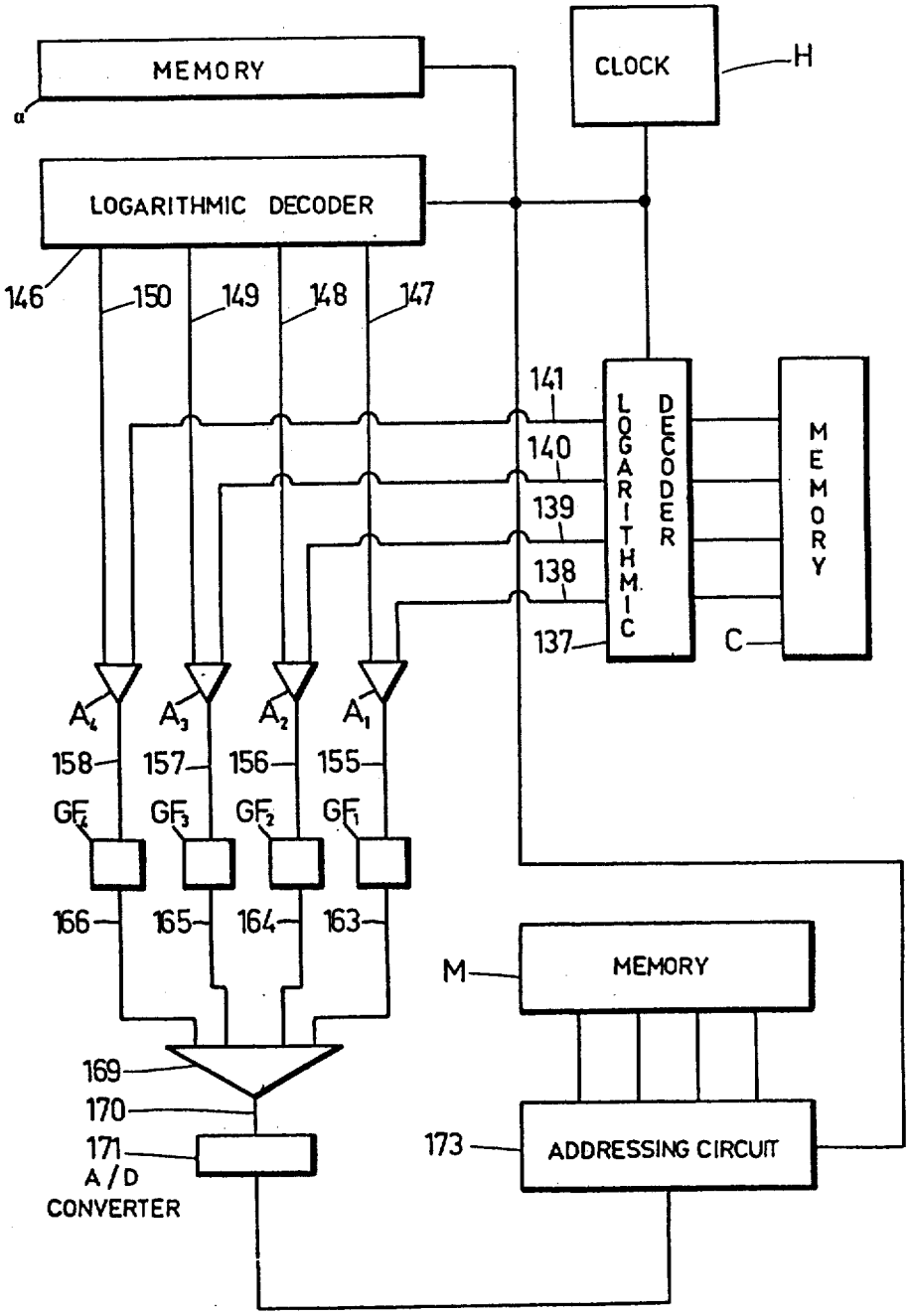
FIG. 5 represents an embodiment of a surface apparatus treating in real time the measurements effected by the sonde of FIG. 2 in order to determine the lithology of the geological formations.

FIG. 5 represents schematically a hybrid computer for treating in real time the measurements effected by the sonde, i.e., being adapted to resolve the equations (1).

This computer comprises a memory C in which the $C_n$ variables are recorded, as previously indicated in connection with FIG. 4. Stored in this memory are the variables $C_1$ to $C_4$, n having been chosen to be equal to 4 in this example. The coefficients $\alpha_{ij}$ determined by standardization, which are constant coefficients, are stored in a memory $\alpha$. The memory C furnishes on four output terminals four electric signals representative of the variables $C_1$ to $C_4$. These signals are transmitted to a logarithmic decoder 137 which furnishes on its four output terminals signals proportional to the logarithm of the variables $C_1$ to $C_4$. These signals are transmitted respectively by the conductors 138 to 141 to the input of the amplifiers $A_1$ to $A_4$.

In the same manner, the coefficients $\alpha_{ij}$ are read by a logarithmic decoder 146 which furnishes on its output terminals signals proportional to the logarithm of these coefficients $\alpha_{ij}$ and which are applied respectively by the conductors 147 to 150 to the amplifiers $A_1$ to $A_4$. The amplifiers $A_1$ to $A_4$ furnish on their respective output terminals electric signals proportional to the sum of the signals which are applied on their input terminals, i.e. signals proportional to the logarithm of the products $\alpha_{ij} \cdot C_i$. The signals delivered by each amplifier are transmitted respectively by conductors 155 to 158 to function generators $GF_1$ to $GF_4$ which restore on their output terminals signals proportional to the products $\alpha_{ij} C_i$. The signals furnished by the generators $GF_1$ to $GF_4$ are transmitted directly by the conductors 163 to 166 to an operational amplifier 169 which sums these signals and delivers on its output terminal an electric signal proportional to $\Sigma\alpha_{ij} C_i$, transmitted by a conductor 170 to an analog-digital converter 171 which transmits its output signal via the conductor 172 to an addressing circuit 173 which provides for the display or storing of the result obtained in a part j of a memory M, this part corresponding to the determined quantity $X_j$ (this quantity consisting of data relating to the lithology), and this result is obtained in addition to the previously determined constant coefficient $\beta_j$ stored in the memory M.

A clock H drives simultaneously the logarithmic decoders 137 and 146 and the addressing circuit 173, thus allowing for the successive storing in the memory M of the quantities $X_j$ corresponding to the lithology of the logged formations.

The memory M is connected to a device for recording and/or visually displaying the determined quantities $X_j$, this device, which has not been shown in the figure, may be of any known type, such as magnetic recording, recording on punched tape, etc.

Figure 6:
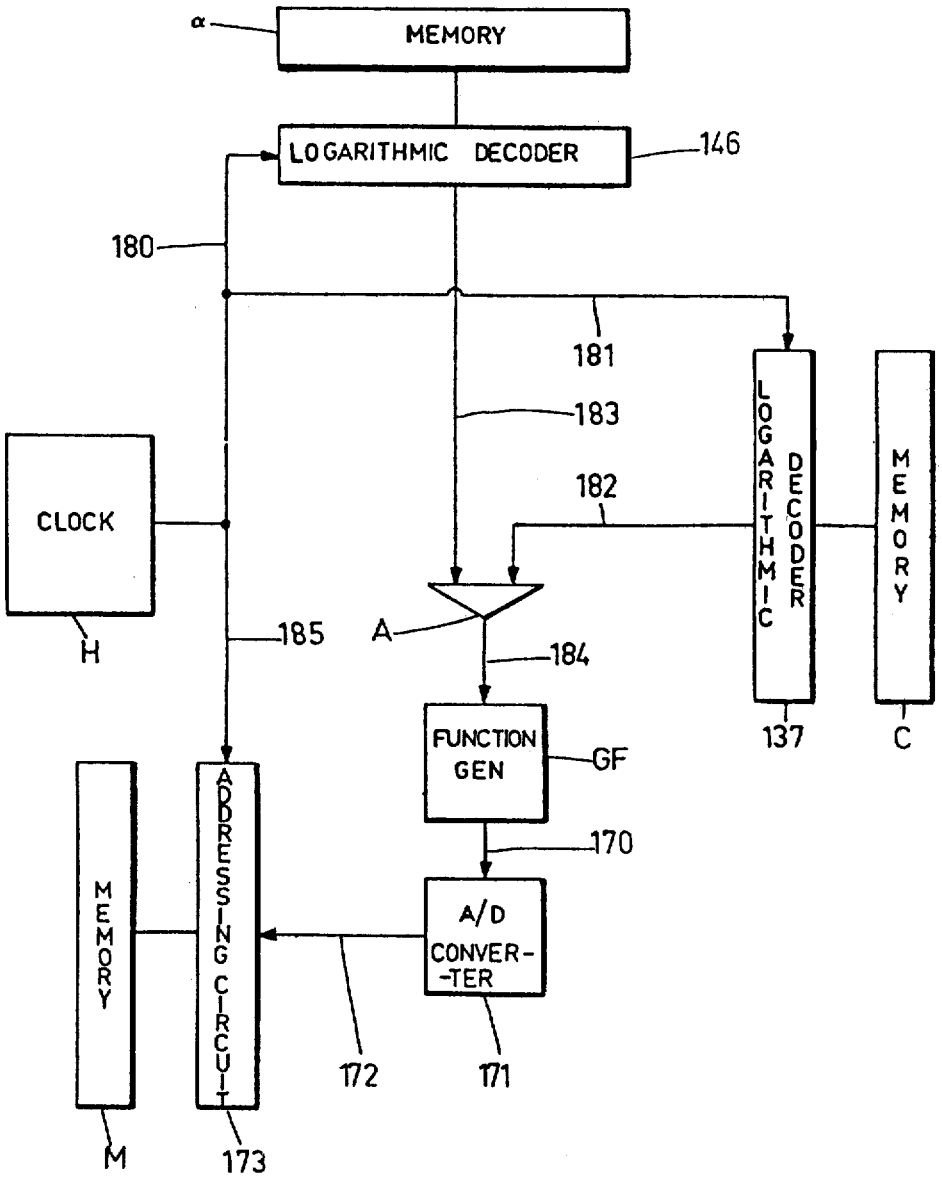
FIG. 6 represents another embodiment of a surface apparatus treating in real time the measurements effected by the sonde of FIG. 2 in order to determine the lithology of the geological formations.

FIG. 6 illustrates another embodiment of a hybrid computer for treating in real time the measurements obtained from the sonde. As in the case of the computer described in connection with FIG. 5, there is an identical memory C in which the variables $C_i$ are recorded, this memory being associated with a logarithmic decoder 137 having one output terminal. In the memory $\alpha$ associated with a logarithmic decoder 146, all the coefficients $\alpha_{ij}$ are stored. The two logarithmic decoders 137 and 146 are driven by a clock H and, at each pulse of the clock received by means of the conductors 180 and 181, the logarithmic decoders deliver simultaneously signals proportional to the corresponding variable $C_i$ and to the coefficients $\alpha_{ij}$ and which signals are transmitted by the conductors 182 and 183 to the input of an amplifiers A. This amplifier delivers a signal proportional to the logarithm of the term $\alpha_{ij} C_i$ which is transmitted by a conductor 184 to a function generator GF which delivers a signal proportional to the product $\alpha_{ij} C_i$. This signal is applied by means of the conductor 170 to an analog-digital converter 171 which furnishes on its output terminal a signal which is transmitted by the conductor 172 to an addressing circuit 173 driven by the clock H by means of the conductor 185. The addressing circuit 173 serves for storing the received signal in part j of the memory M corresponding to the computed quantity $X_j$.

Figure 10:
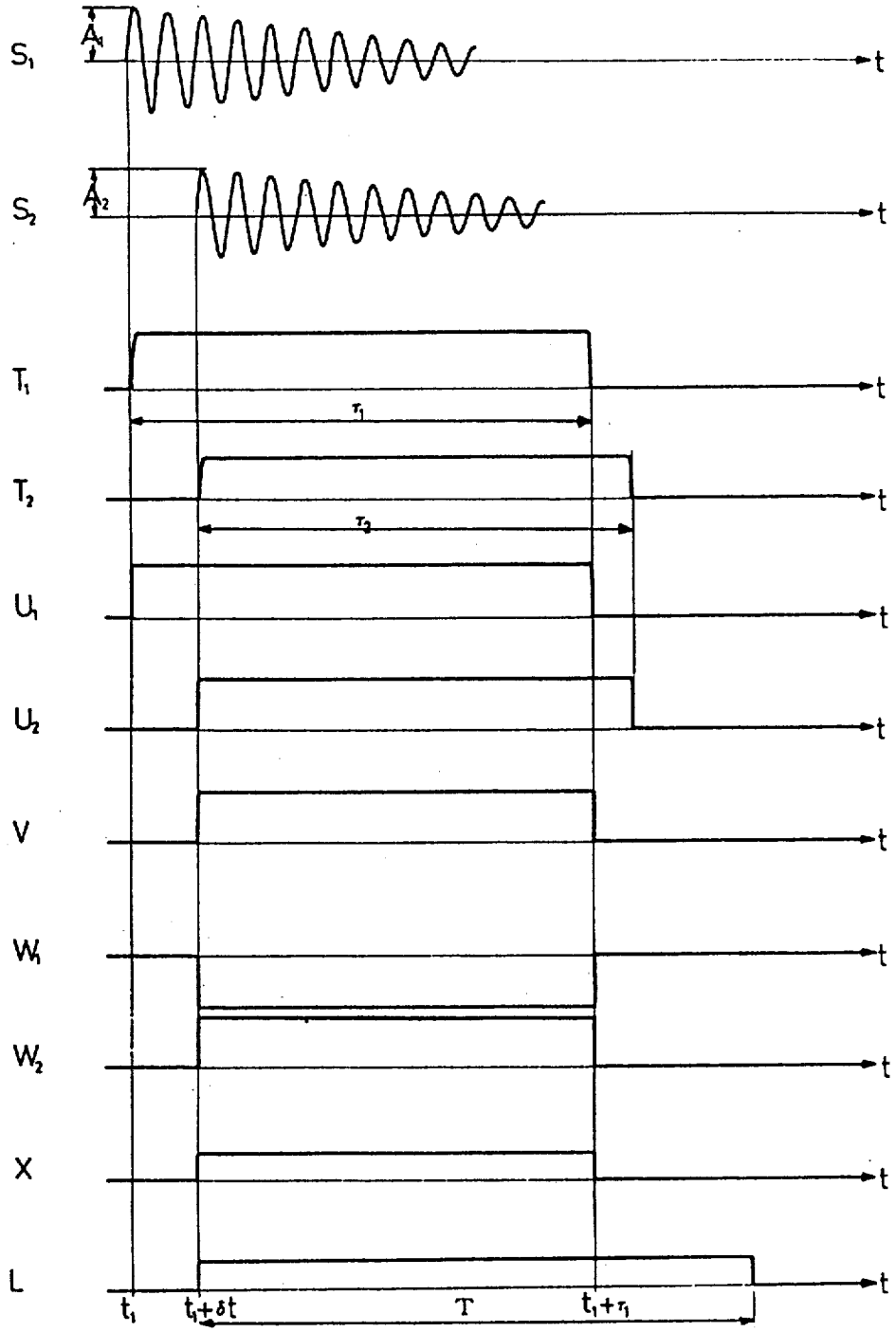
FIG. 10 illustrates the operation of the apparatus of FIG. 9.
Figure 11:
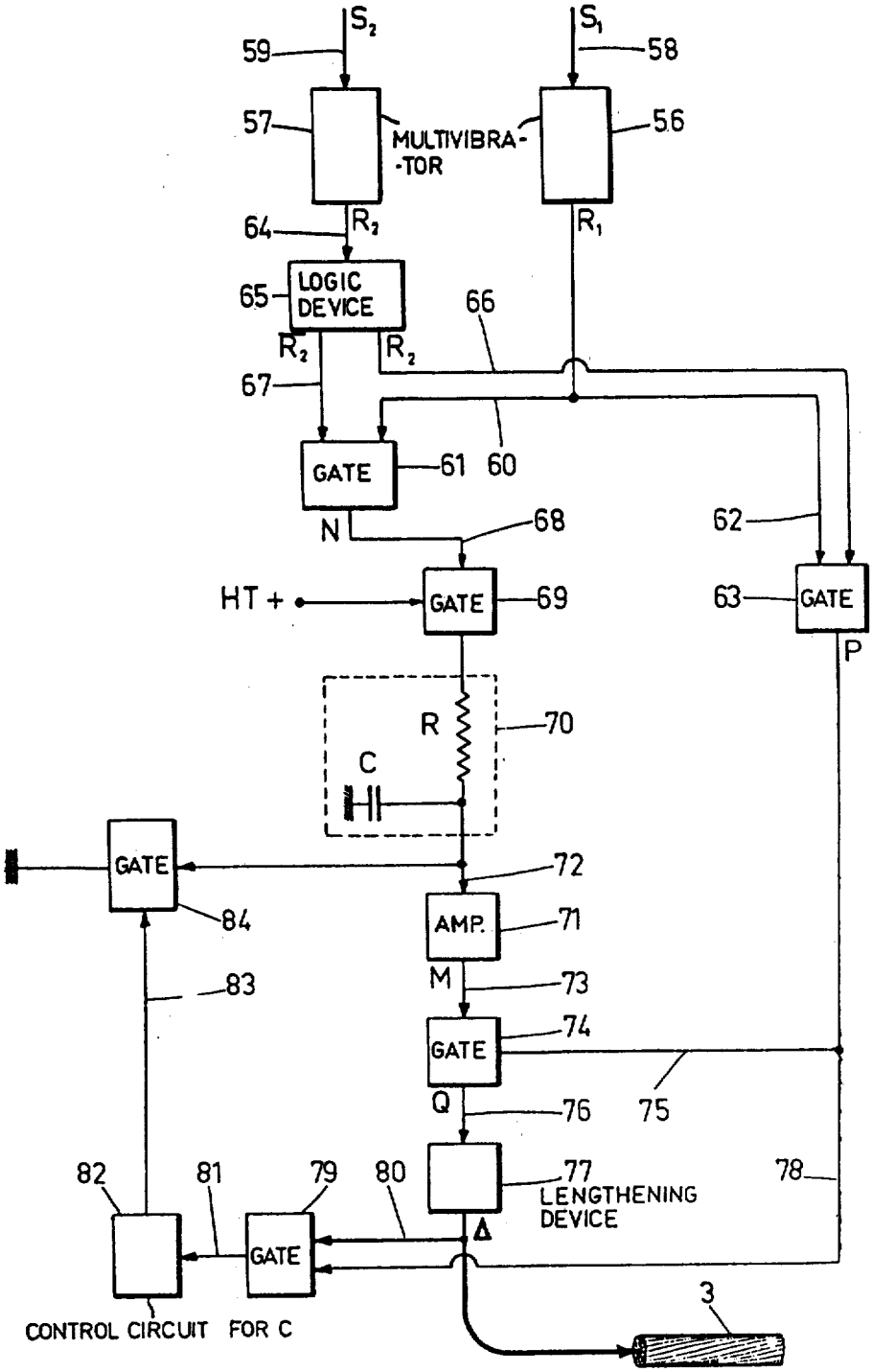
FIG. 11 represents schematically an apparatus for measuring the transit time of an acoustic wave being propagated in the geological formations.

The hybrid computer described in FIG. 11 is of a simpler construction than that described in connection with FIG. 10, but it requires a longer time for the determination of the values of the quantities $X_j$.

It is understood that, instead of treating on the site the measurements obtained from the sonde, it would also be possible to record the same and the recorded measurements would thereafter be transmitted to a treatment center where they could be combined according to the process which has been described.

Figure 7:
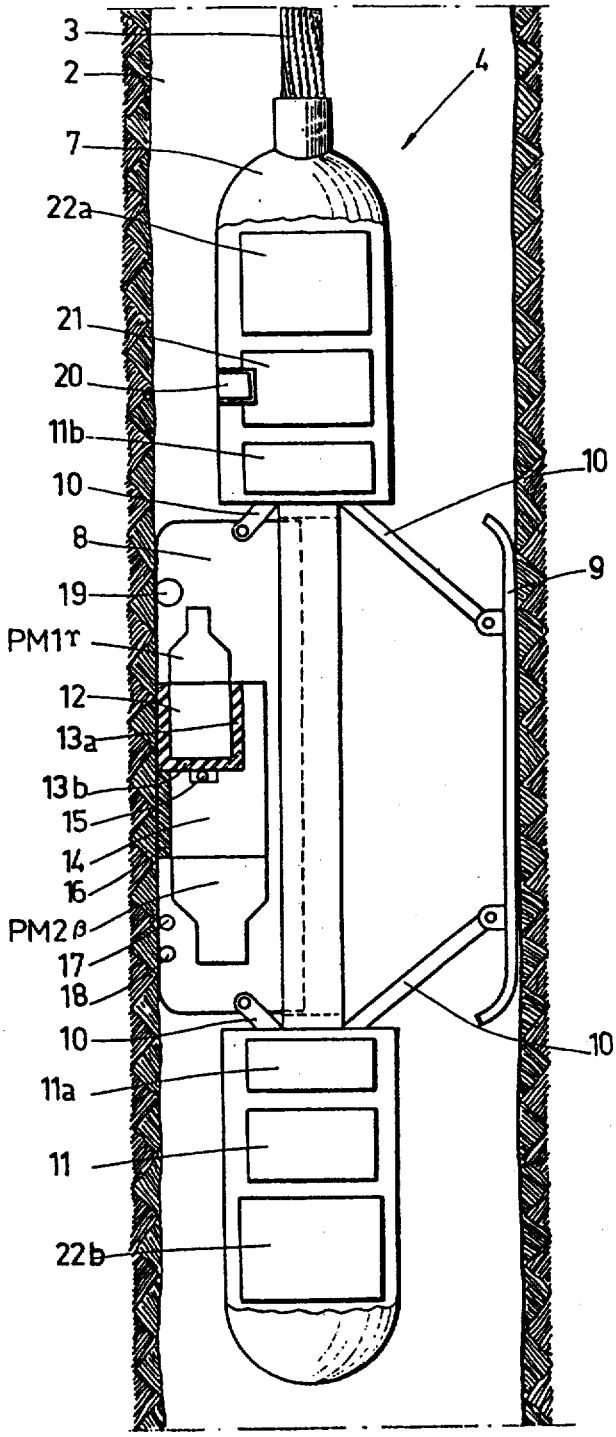
FIG. 7 illustrates a second particular embodiment of a measuring sonde allowing for determining simultaneously the lithology, porosity and permeability of the geological formations.

FIG. 7 shows a sonde for determining simultaneously the lithology, the porosity, and the permability of geological formations. This sonde is composed of a $\gamma$ logging device identical to that described with respect to FIG. 2, combined with an acoustic logging device as described below.

The pad or guide block 8 is equipped at the lower part thereof with two acoustic receivers 17 and 18 and, at the upper part thereof, with an emitter or transmitter 19 of acoustic waves. Mounted on the upper part of the sonde body is an emitter or transmitter 20 of acoustic waves. The transmitters 19 and 20 and the receivers 17, 18 are disposed in the same diametric plane of the borehole. Only the transmitter 20 is not in contact with the wall of the borehole, whereas the transmitter 19 and the receivers 17 and 18 carried by the guide block 8 are in contact with the wall of the borehole 2 in the measuring position of the sonde.

The transmitter 20 is designed for generating waves propagated essentially in the longitudinal way or mode. For this reason it is placed slightly recessed in the body of the sonde so as to maintain a thickness of several centimeters of drilling mud between the formation and this transmitter. The presence of this liquid interface stops the waves being propagated in the transversal way or mode and allows only for the propagation of longitudinal waves. According to a preferred embodiment, the transmission frequency is chosen higher than 20 kHz and is preferably in the range between 20 to 80 kHz, and, for technological reasons, a transmitter of the magnetostrictive type will be preferably employed.

The transmitter 19 is designed for generating waves similar to transversal waves. For this purpose and for technological reasons, it is of the piezoelectric type and operates, for example, at a frequency at least equal to 80 kHz, and preferably in the range between 80 and 25 kHz. It is applied against the formation without interposition of liquid film. Experience has shown that, under these conditions, the wave train of the greater propagation velocity at the interface well formation and which will correspond to the first arrival of energy which will be solely taken into account at the receivers, is similar to a train of transversal waves.

For each transmitter the power is such that, at each receiver, the signal-to-noise ratio will permit the obtaining of accurate measurements. Since the attenuation of the acoustic waves during their travel in the geological formations is exponential, it is desirable that the receivers and transmitters be disposed as close to each other as possible. Nevertheless, there is a limit since the spacing between receivers must be sufficient in order that the measurements be possible, and the spacing between transmitters and receivers must be such that a certain number of static acoustic phenomena with respect to the measurements which are produced particularly at the contact zone of piezoelectric transmitter with the formation be completely attenuated by absorption in the geological formations. It has been found that these requirements are met for a minimum distance between receivers in the order of one wave length, and between transmitters and receivers in the order of about ten wave lengths of the acoustic vibrations being emitted.

In this embodiment, the distance between the receivers 17 and 18 is in the range between 5 and 10 centimeters; the distance between the receiver 17 and the transmitter 19 is in the range between 40 and 80 centimeters, and the distance between the receiver 17 and the transmitter 20 is chosen to be in the range between 60 and 150 centimeters.

The transmitters and the receivers are supplied with electric energy by a feeding block schematically indicated with reference numeral 21 and housed, for example, in the body of the sonde. The feeding block 21, which is of a conventional type, will not be described in detail herein. It furnishes to the various elements the electric energy with suitable voltages and intensities. The signals delivered by the receivers 17 and 18 are transmitted to an electronic group 22b which is housed, for example, in the body of the sonde. These signals are treated by the group 22b—which will be described in further detail hereinbelow—and the data transmitted to the surface by conductors of the cable 3.

Figure 8:
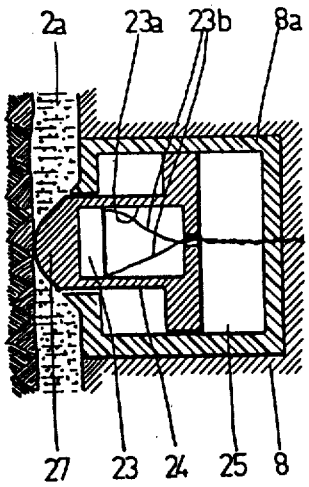
FIG. 8 illustrates a particular embodiment of the piezoelectric emitters and receivers of the sonde represented in FIG. 7.

FIG. 8 represents, at an enlarged scale, a particular embodiment of the piezoelectric transmitters and receivers of the sonde placed in contact with the geological formations. Each of these is composed of a feeling head 24 housed in a cavity 25 which is disposed in the guide block 8 of the sonde. The feeling head 24 may be displaced in the cavity 25 perpendicularly to the axis of the borehole 2 due to the action of any known means that may be operated by remote control, such as, for example, elastic means, hydraulic means, or means with springs, being placed between the guide block and the end of the feeding head situated at the inside of the cavity 25. The displacement of the feeling head 24 may be on the order of several centimeters for reasons which will be explained further hereunder.

The feeling head 24 which has, for example, an essentially cylindrical configuration has an essentially conical outer end or contact piece 27 whose apex terminates in a spherical cap. The feeling head 24 consists of a rigid, for example metallic, material adapted to transmit the acoustic vibrations. Disposed in the body of the feeling head 24 is a fluid-tight housing 23a into which is placed a piezoelectric element 23 which latter is sensitive to the acoustic vibrations and which is in contact with the walls of this housing. This element 23 may consist, for example, of a stack of piezoelectric disks, made for example from barium titanate ($Ba\ Ti\ O_4$) whose axis of rotation which extends essentially through the apex of the contact piece 27 and is perpendicular to the axis of the borehole 2. The sensitive element 23 is provided for in such a manner that, upon receiving an electric pulse, it vibrates preferably in a direction perpendicular to the surface of the geological formation with which it is in contact by means of the feeling head 24. Electric conductors 23b transmit the electrical signals delivered by the sensitive element 23, or transmitted thereto, depending upon whether the device operates as receiver or as transmitter.

The device operates in the following manner:

When the sonde has been placed into the borehole 2 at the desired depth, the guide blocks or pads are spaced from the body of the sonde until they come into contact with the mud cake 2a which covers the wall of the borehole. Upon the action of elastic means (not shown), the feeling head penetrates into the cake until the end of the contact piece 27 comes into contact with the geological formations. During the displacements of the sonde, when the measurements are made, the elastic means hold the contact piece 27 constantly in contact with the geological formations. In the case where the device operates as a receiver, the acoustic waves propagated in the geological formations are transmitted to the sensitive element 23 by the feeling head 24. The sensitive element 23 which is then subjected to vibrations delivers an electric signal representative of these waves, this signal then being transmitted by the conductors 23b to the electronic apparatus with which the sonde is equipped. In the case where the device operates as a transmitter, the electric signal transmitted by the conductors 23b causes the sensitive element 23 to vibrate, and these vibrations are transmitted to the geological formations by means of the contact piece 27 of the feeling head 24.

It is understood that the transmitters and receivers are separated from each other by means one of which is schematically indicated with reference numeral 8a in FIG. 8 and consists of a material absorbing the vibrations transmitted to the guide block 8.

The emitters 19 and 20 operate alternatively at a low recurrence frequency in the range between 5 and 50 Hz, for example. The acoustic waves emitted by the piezoelectric transmitter 19 are propagated practically exclusively in the geological formations the first energy arrivals reaching successively the receivers 17 and 18 are similar to waves of the transversal type. The acoustic waves emitted by the magnetostrictive transmitter 20 are transmitted through the mud to the geological formations in which they are propagated, and the first energy arrivals of the longitudinal wave type reach successively the receivers 17 and 18.

Upon receiving of acoustic signals from any one of the transmitters, the receivers deliver electric signals which are transmitted to the electronic group 22b (FIG. 7) which generates for each of the waves a signal representative of the travel time in the geological formations between the two transmitters the difference of the times of arrival of an acoustic wave at each of the receivers and a signal representative of the attenuation of the wave between the two receivers (proportional to the ratio of the amplitudes of the first electric oscillation delivers by each receiver).

Figure 9:
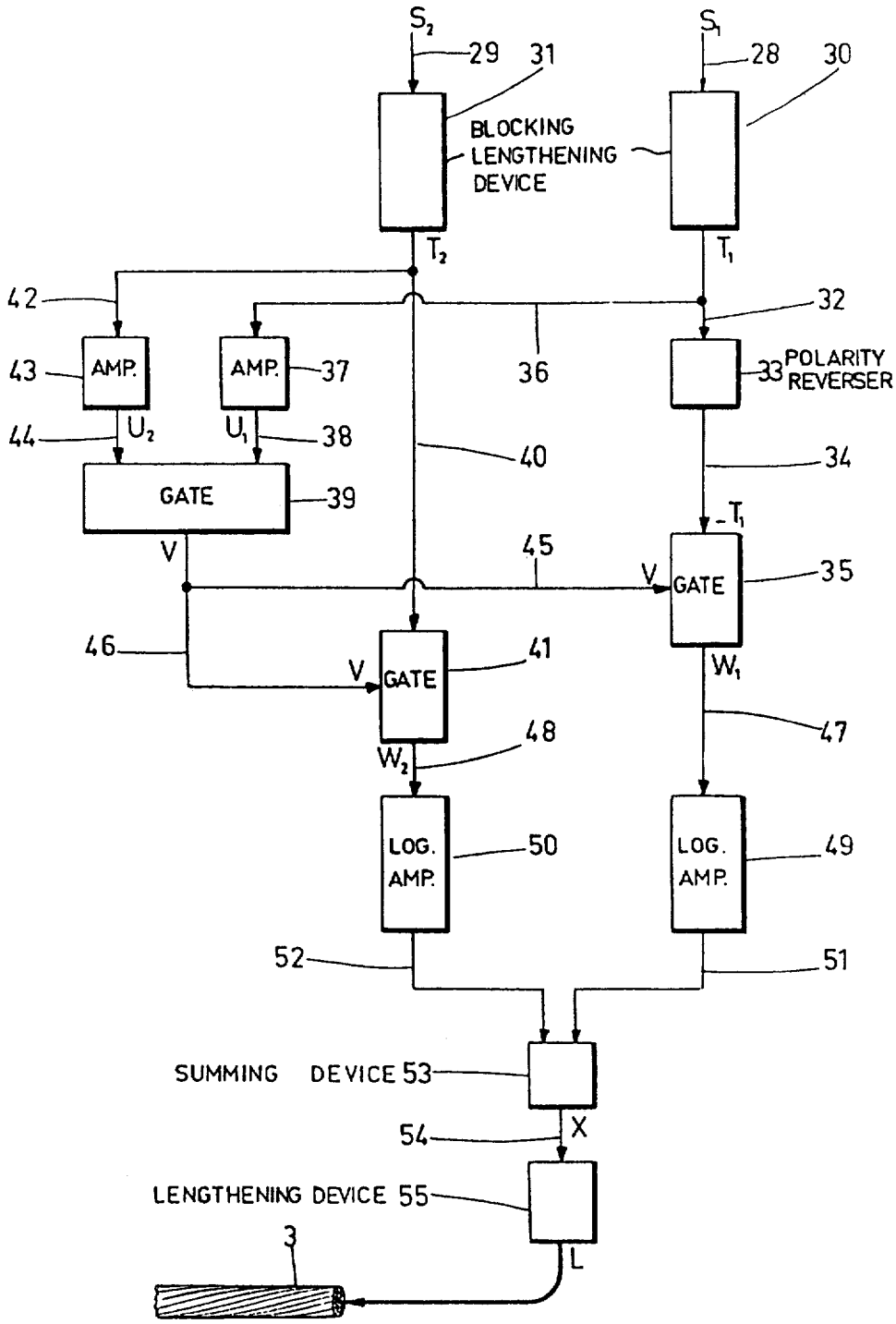
FIG. 9 represents schematically an electronic apparatus for measuring of the attenuation of an acoustic wave being propagated in the geological formations.

FIG. 9 illustrates schematically the part of the electronic group 22 serving for measuring the attenuation between the receivers 17 and 18 of an acoustic wave transmitted from one or the other of the transmitters.

FIG. 10 represents the different electric signals illustrating the operation of the device of FIG. 9.

An acoustic signal which is propagated in the geological formations by the transmitter 20 or 19 reaches successively the receivers 17 and 18 at the respective instants $t_1$ and $t_1+\delta t$. The receiver 17 delivers an electric signal $S_1$ shown in FIG. 10. This signal is an oscillatory signal whose first half-cycle has an amplitude $a_1$. Upon receiving the same acoustic signal, after a time interval $\delta t$, the receivers 18 delivers an electric signal $S_2$ (FIG. 10) whose first half-cycle has an amplitude $A_2$. The electric signals $S_1$ and $S_2$ are transmitted respectively by the conductors 28 and 29 to blocking-lengthening devices 30 and 31. These devices pick up the first oscillations of the signals $S_1$ and $S_2$, lengthen them respectively by a duration $\tau_1$ and $\tau_2$, and deliver on the respective output terminals the electric signals $T_1$ and $T_2$ (FIG. 10).

The signal $T_1$ furnished by the device 30 is transmitted by the conductor 32 to a polarity reverser 33 which delivers thereupon an electric signal $-T_1$ transmitted by a conductor 34 to a first input of an analog gate 35. The signal $T_1$ is simultaneously transmitted by the conductor 36 to a saturated amplifier 37. This amplifier 37 which operates in an on-off fashion delivers at its output a signal in the form of a rectangular wave $U_1$ (FIG. 10) having a fixed amplitude when it receives a control signal $T_1$. In this manner, the signal $U_1$ exists simultaneously with the signal $T_1$, but its amplitude is independent of the amplitude of the control signal $T_1$ which has initiated its generation. The signal $U_1$, furnished by the amplifier 37, is transmitted by the conductor 38 to a first input of an AND type gate 39.

In the same manner, the signal $T_2$ delivered by the device 31 is transmitted by the conductor 40 to a first input of an analog gate 41 and by the conductor 42 to a saturated amplifier 43 which, upon receiving the control signal $T_2$, furnishes a signal $U_2$ (FIG. 10) of the same amplitude as the signal $U_1$. The amplifier 43 is connected by the conductor 44 to the AND-type gate 39 and the signal $U_2$ is transmitted to the second input of this AND gate. The AND gate generates a signal V (FIG. 10) having a constant amplitude when its receives simultaneously on the two inputs thereof the signals $U_1$ and $U_2$. As shown in FIG. 10, the signal V in the form of a rectangular wave exists from the instant $t_1+\delta t$ until the $t_1+\tau_1$, thus having a duration of $\tau_1-\delta t$. The output of the AND gate 39 is connected by way of the conductors 45 and 46 with the analog gates 35 and 41, respectively. The analog gate 35 passes the signal $-T_1$ issuing from the polarity reverser 33 only when it receives simultaneously the control signal V by the conductor 45. In the same manner, the analog gate 41 passes the signal $T_2$ issuing from the blocking-lengthening device 31 only when it receives simultaneously the control signal V by the conductor 46. The analog gates 35 then deliver respectively the electric signals $W_1$ and $W_2$ (FIG. 10) transmitted by the conductors 47 and 48 to the logarithmic amplifiers 49 and 50 which furnish on the output terminals thereof signals whose amplitude is proportional to the logarithm of the amplitudes of the signals $W_1$ and $W_2$, respectively. These logarithmic amplifiers are connected by means of conductors 51 and 52 to a summing device 53 which furnishes an electric signal X (FIG. 10) whose amplitude is proportional to the logarithm of the ratio $A_2/A_1$.

The summing device 53 is connected by the conductor 54 with a lengthening device 55 which delivers at the output thereof a signal L in the form of a rectangular wave having the amplitude k Log $(A_2/A_1)$ and having a calibrated duration T. This predetermined duration is chosen to be sufficient so as to ensure correct transmission of the signal L to the surface by the cable, i.e., such that at the arrival of the signal on the surface there remains a portion of the signal which is not affected by the transmission.

It is to be understood, as has already been indicated previously herein, that the transmitters 19 and 20 operate alternatively and the electronic apparatus of FIG. 9 successively delivers a signal L and a signal L′ being representative of the attenuation of the transversal and the longitudinal waves that are successively emitted by the two transmitters. The signal L and L′ which have calibrated durations, for example in the order of 120$\mu$, are transmitted by the same conductor of the cable 3, and since the recurrence frequency of operation of the transmitters 19 and 20 is low (5 to 50 Hz), there is no interference whatsoever possible between the signals L and L' which are delivered by the electronic apparatus substantially at the operating frequency of the transmitters.

Figure 12:
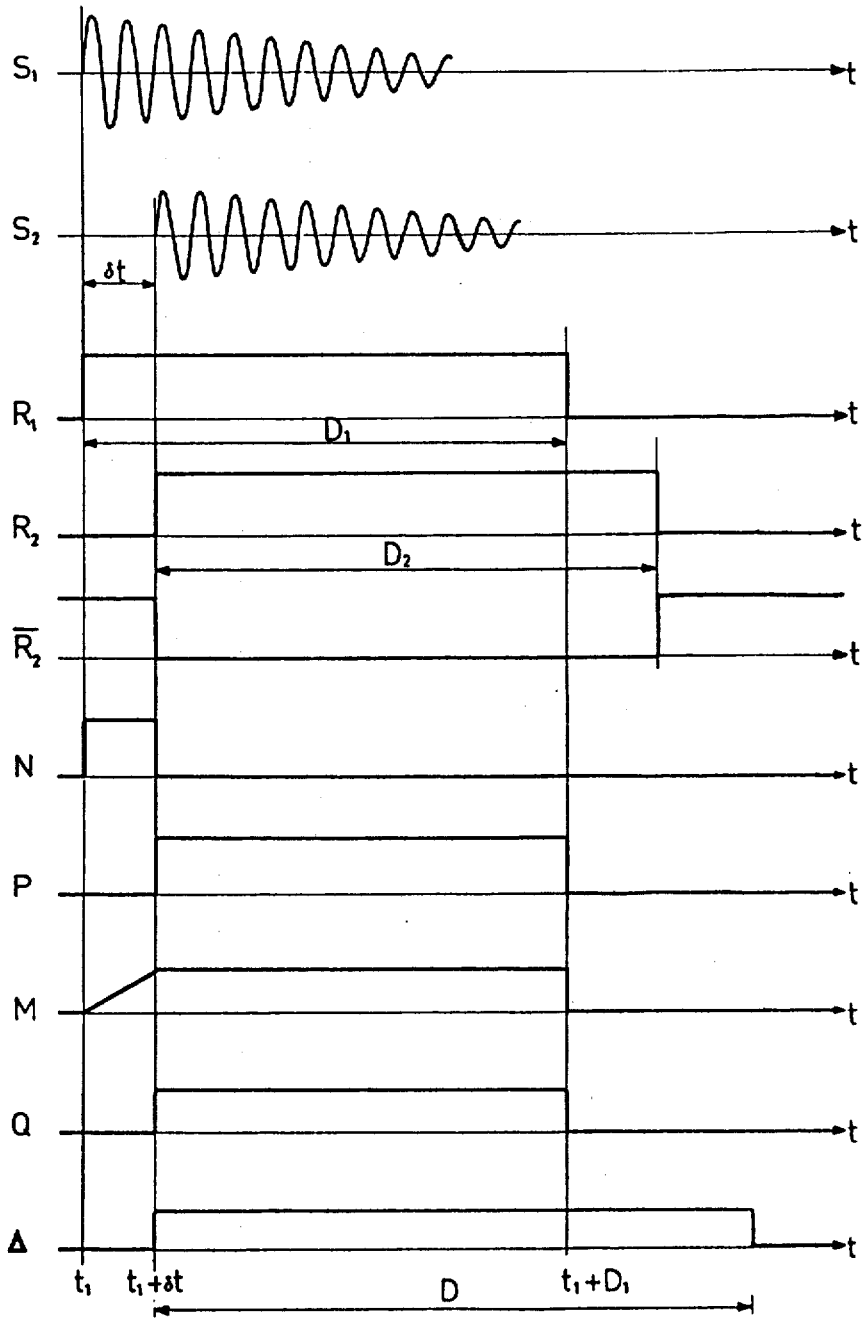
FIG. 12 illustrates the operation of the apparatus of FIG. 11.

FIG. 11 illustrates schematically the electronic apparatus contained in the sonde for measuring the travel time of an acoustic wave between the receivers 17 and 18. FIG. 12 represents the signals produced during the operation of the apparatus illustrated in FIG. 11.

As has already been indicated, an acoustic signal which is propagated in the geological formations by the transmitter 19 or 20, reaches successively the receivers 17 and 18 at the respective instants $t_1$ and $t_1+\delta t$, and the receivers deliver respectively the electric signals $S_1$ and $S_2$ (FIG. 12). The signals $S_1$ and $S_2$ are transmitted respectively to monostable or one-shot multivibrators 56 and 57 by the conductors 58 and 59. Upon receiving of the signal $S_1$, the monostable multivibrator 56 delivers a signal $R_1$ (FIG. 12) in the form of a rectangular wave, having a constant amplitude and a calibrated duration $D_1$. This signal is transmitted by the conductor 60 to an input of a first device 61 which is an AND-type gate, and by means of the conductor 62 to an input of a second device 63 which is also an AND-type gate.

Upon receiving a signal $S_2$, the monostable multivibrator 57 delivers a signal $R_2$ (FIG. 12) in the form of a rectangular wave having a constant amplitude and calibrated duration $D_2$. This signal is transmitted by the conductor 64 to a logical device 65 which returns on one of its outputs the signal $R_2$ having been transmitted by the cable 66 to a second input of the AND gate 63. On the second output terminal thereof, the device 65 furnishes a signal $R_2$ (FIG. 12) that is complementary of the signal $R_2$ and transmitted by the conductor 67 to the second input terminal of the AND gate 61. The latter delivers a signal N (FIG. 12) when it receives simultaneously the signals $R_1$ and $R_2$, i.e.,—as is apparent from FIG. 12, a signal having a duration $\delta t$. The signal N transmitted by the conductor 68 actuates an analog gate 69 which connects a high-voltage source HT to time-amplitude conversion circuit 70. The circuit 70 comprises, for example, a capacitor C charged through a resistor R whose time constant RC is much higher than $\delta t$. Closing of the analog gate by the signal N produces the charge of the capacitor C during a time interval $\delta t$. At the end of the charge, the electric voltage at the terminals of the capacitor C reaches a value proportional to $\delta t$, a value which it retains as long as the capacitor C is not discharged.

A reading amplifier 71 is connected to the output of the time-amplitude conversion device 70 by a conductor 72 and delivers a signal M (FIG. 12) which is transmitted by a conductor 73 to an analog gate 74. The gate 74 is connected by a conductor 75 to the output of the AND gate 63. The latter delivers a signal P (FIG. 12) in the form of a rectangular wave when it receives simultaneously by way of the conductors 62 and 66 the signals $R_1$ and $R_2$, in other words, a signal beginning at the instant $t_1+\delta t$ and having a duration of $D_1-\delta t$, during which the signals $R_1$ and $R_2$ exist simultaneously. The signal P actuates the analog gate 74 which then passes the signal M between the instants $t+\delta t$ and $t_1+D$, thus delivering the signal Q (FIG. 12) having an amplitude proportional to $\delta t$. The signal Q is transmitted by the conductor 76 to a lengthening device 77 which transforms the signal Q into a signal $\Delta$ having an amplitude k St and a predetermined duration D chosen in such a manner to ensure a correct transmission of the signal $\Delta$ to the surface. The signal $\Delta$ furnished by the lengthening device 77 is transmitted to the surface by a conductor of the cable 3. The signal P furnished by the gate 63 is transmitted by the conductor 78 to a first input of a device 79 which is an OR-type gate and receives on the second input thereof the signal $\Delta$ delivered by the lengthening device 77 and transmitted by the conductor 80. At the reception of one of these two signals, the OR gate 79 delivers on its output terminal a signal transmitted by the conductor 81 to a circuit 82 adapted to control the discharge of the capacitor C. The signal furnished by the gate 79 places the circuit 82 in operating condition. When this signal disappears, the circuit 82 delivers a control pulse transmitted by the conductor 83 for actuating an analog gate 84 that short-circuits the capacitor C and causes the abrupt discharge thereof.

It is understood as has previously been indicated herein that the transmitters 19 and 20 operate alternatively and that the electronic apparatus of FIG. 11 successively delivers a signal $\Delta$ and a signal $\Delta'$ representative of the travel time in the geological formations between the receivers 17 and 18 of the transversal and the longitudinal waves emitted successively by the two transmitters. The signals $\Delta$ and $\Delta'$ which have calibrated durations, for example on the order of $\mu$s, are transmitted to the surface by the same conductor of the cable 3, and since the operation recurrence frequency of the transmitters 19 and 20 is low (5 to 50 Hz), there is no interference whatsoever possible between the signals $\Delta$ and $\Delta'$ which are delivered by the electronic apparatus substantially at the operating frequency of the transmitters.

In the embodiment described hereinabove, the first half-cycle of each signal delivered by the receivers has been used. Obviously it would be possible to use, instead of the first half-cycle, a predetermined half-cycle of each of the signals so as to obtain in the same manner the travel times and the attenuations of the longitudinal and transversal acoustic waves.

The cable 3 which assures the connection between the sonde and the surface is advantageously a cable of a commercially available type containing seven conductors. One of the conductors is used as ground conductor and may be common to all of the electronic apparatus contained in the sonde. Two other conductors allow for feeding or supplying the sonde with electric energy for example and alternating current of 220 volt at 50 Hz from which there is produced the high-voltage and low-voltage direct current necessary for the operation of the sonde. Another conductor is utilized for the transmission of the $\gamma$ spectrometry signals from the sonde toward the surface, the signals $\Delta$, $\Delta'$, and L,L' corresponding to the acoustic measurements being transmitted by two separate conductors, while the data being delivered by the diametric measuring device 11 (FIG. 7) may be transmitted by one of the two conductors being utilized for the transmission of acoustic data, or possible, by the remaining conductor.

Besides the coded pulses representative of the diameter of the borehole at the level of the sonde and the $\gamma$ pulses having constant durations whose amplitudes are proportional to the energy of the $\gamma$ radiation emitted by the formations, the sonde also delivers to the surface apparatus, during one measuring interval, the following signals:

a. pulses having constant durations whose amplitudes are representative of the travel time between the two receivers of the acoustic waves being propagated in the geological formations, and b. pulses having constant durations whose amplitudes characterize the attentuation of the acoustic waves being propagated in the formations.

The mobility of the fluids at the interior of the geological formations, the lithology, and the porosity of the geological formations are obtained by resolving equations of the type $$X_j = \Sigma_{i=1}^{i=n+4} \alpha_{ij} C_i + \beta_j \quad (2)$$

in which $X_j$ designates one of the following quantities;

the clay content the content in carbonates the quartz content the cationic exchange capacity the porosity the mobility As indicated hereinabove, the coefficients $\alpha_{ij}$ and $\beta_j$ are given coefficients varying with the data $X_j$ to be measured. One way of determining these coefficients will be indicated hereinafter.

The coefficients $C_i$ are determined by the measurements that are effected by the sonde. These coefficients which are variables and functions of the nature of the terrain, comprise 1. the coefficients $C_1$ to $C_n$ representing the contents of n bands A, B, C, D . . . N judiciously chosen in the $\gamma$ spectrum transmitted from the geological formations, as represented for example in FIG. 3 in the case where n=4;

2. the coefficients $C_{n+1}$ and $C_{n+2}$ which are respectively the average values of the travel times $\Delta$ and $\Delta'$ between the receivers, transversal and longitudinal acoustic waves, these average values being indicated as $\Delta_m$ and $\Delta'_m$; and 3. in the case where the measured quantity is the mobility of the fluid inside the geological formation, with $X_j$ then being the logarithm of the mobility that is sought, equation (2) comprises two supplementary variables $C_i$, namely $C_{n+3}$ and $c_{n+4}$, representing respectively the average value of the logarithm of the ratio of the amplitudes of the first half-cycles of the signals delivered by the receivers, these average values being indicated as $L_m$ and $L'_m$. It is understood that, in solving the equation, two corresponding coefficients $\alpha_{ij}$ are then introduced ($\alpha_{(n+3)j}$ and $\alpha_{(n+4)ij}$).

In order not to complicate the surface apparatus excessively, the determination of the coefficients $\alpha_{ij}$ and $\beta_j$ is made by standardization or calibration on the basis of measurements, carried out for example in the laboratory, on ground samples taken during the drilling operation. In a preferred embodiment, these samples are cored samples, but it is equally possible to use excavated drilling materials, if it is known with certainty from which slope they come.

The number of terrain samples necessary may be small since it is sufficient to have at least one sample representing each of the types of geological formations traversed by the borehole. On the basis of these samples taken in this manner, a determination is made, for example in the laboratory and with conventional methods, of the values of the quantities $X_j$ (clay content, carbonate content, quartz content, cationic exchange capacity, porosity, and mobility). During the logging operation, there is noted the values of the variables $C_i$ measurements corresponding to the samples taken. The series of the values of the coefficients $\alpha_{ij}$ and $\beta_j$ is thereafter determined by the conventional mathematical process of multiple linear regression which is well-known in the art.

The first n variables $C_1$ to $C_n$ represent the number of $\gamma$ rays recorded during the measuring time (for example during 30 seconds) and having an energy comprised between predetermined limits. In practice, the number n will be small, comprised between 3 and 7, and the energy range explored will be large, for example from 0.1 to 3.5 MeV, and generally at least between 0.4 and 2.7 MeV. The elaboration or production of the variables $C_i$ is carried out as indicated hereinabove in connection with FIG. 4.

The variables $C_{n+1}$ to $C_{n+4}$ represent, as indicated above, the average values $\Delta_m$, $\Delta'_m$, $L_m$, $L'_m$ or the pulses $\Delta$, $\Delta'$, L, L' which may be established during the time necessary for the recording, for example 30 seconds, a time period during which there is obtained for an operating recurrence frequency of the acoustic transmitters comprised between 5 and 50 Hz, a number of measurements between 75 and 750 for each of the values $\Delta$, $\Delta'$, L and L', as defined previously. The average is obtained, for example, by adding up the values of each measurement in four digital memories.

A clock for synchronizing the measurements relative to the $\gamma$ radiation with the acoustic measurements is utilized for determining these averages. This clock may be contained in the sonde, or in the surface apparatus, and it assures moreover the separation of the pulses $\Delta$, $\Delta'$, and L, L' and the pulses delivered by the diametric measuring device 11 of the sonde being transmitted by two conductors of the cable 3.

The treatment of each series of pulses $\Delta$, $\Delta'$, and L, L' is performed by an analog-digital conversion of the amplitude of the transmitted pulse. This may be obtained, for example, by an amplitude-time conversion with the notation being operated, during the time interval proportional to the amplitude of the pulse, by opening a gate through which pass very short pulses calibrated at high frequency (for example 20 MHz), and these pulses are stored in a counter register and added to the contents of the digital memory.

Figure 13:
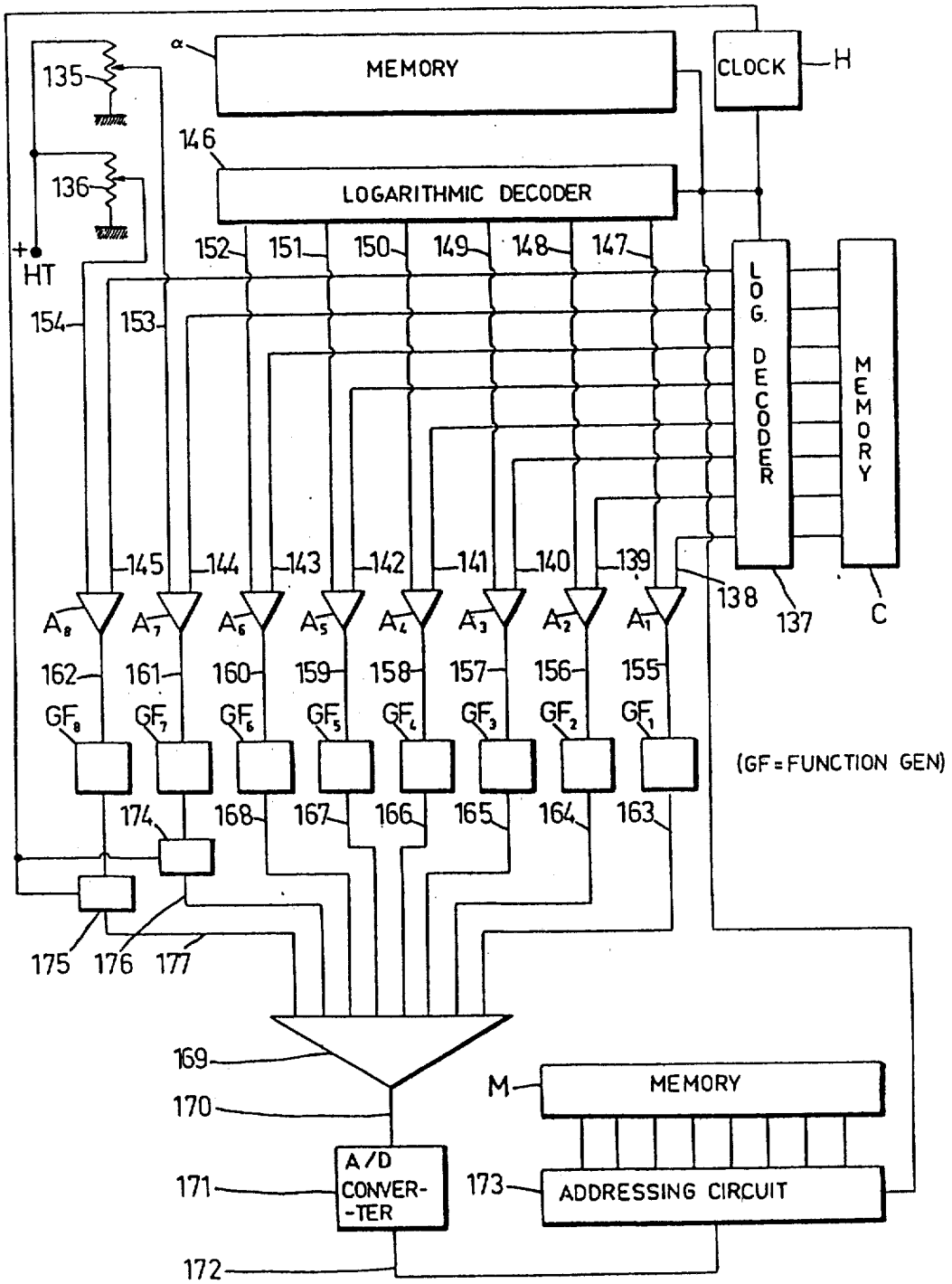
FIG. 13 represents an embodiment of a surface apparatus treating in real time the measurements effected by the sonde illustrated in FIG. 7.

FIG. 13 represents schematically a hybrid computer of the type such as the one described in connection with FIG. 5 and designed for treating in real time the measurements obtained from the sonde described in FIG. 7, i.e., a hybrid computer adapted to solving the equations (2).

This computer comprises a memory C within which are recorded the $C_{n+4}$ variables defined previously. Stored in this memory are the variables $C_1$ to $C_8$, which have not been chosen to be equal to 4 in this example. The coefficients $\alpha_{ij}$ determined by standardization or calibration which are constant coefficients are stored in a memory $\alpha$. The supplementary coefficients $\alpha_{ij}$, i.e., the coefficients $\alpha_{(n+3)j}$ and $\alpha_{(n+4)j}$ defined hereinabove and being necessary for determining the mobility logging are stored in the form of voltages delivered by two potentiometers 135 and 136 which allows for a simplified arrangement of the memory $\alpha$.

The memory C delivers on eight output terminals eight electric signals representative of the variables $C_1$ to $C_8$. These signals are transmitted to a logarithmic decoder 137 which delivers on its eight output terminals signals proportional to the logarithm of the variables $C_1$ to $C_8$. These signals are transmitted respectively by the conductors 138 to 145 to the input of the amplifiers $A_1$ to $A_8$.

In the same fashion, the coefficients $\alpha_{ij}$ (from $\alpha_{ij}$ to $\alpha_{(n+2)j}$) are read by a logarithmic decoder 146 which delivers on its output terminals signals proportional to the logarithm of these coefficients $\alpha_{ij}$, which are applied respectively by the conductors 147 to 152 to the amplifiers $A_1$ to $A_6$. The voltages delivered by the potentiometers 135 and 136 which are proportional to the logarithm of the supplementary coefficients necessary for determining the mobility are transmitted respectively by the conductors 153 and 154 to the amplifiers $A_7$ and $A_8$.

The amplifiers $A_1$ to $A_8$ deliver on their respective output terminals electric signals proportional to the sum of the signals which are applied on their input terminals, i.e., signals proportional to the logarithm of the products $\alpha_{ij} \cdot C_i$. The signals delivered by each amplifier are respectively transmitted by conductors 155 to 162 to function generators $GF_1$ to $GF_8$ which restore on their output terminals signals proportional to the products $\alpha_{ij} \cdot C_i$. The signals furnished by the generators $GF_1$ to $GF_8$ are transmitted directly by the conductors 163 to 168 to and 176 to 177 to an operational amplifier 169 which sums these signals and delivers on its output terminal an electric signal proportional to $$\Sigma_{i+n}^{1=n+4} \alpha_{ij} \cdot C_j,$$

transmitted by a conductor 170 to an analog-digital converter 171 which transmits its output signal through the conductor 172 to an addressing circuit 173 which serves for storing the result obtained in a part j of a memory M, this part corresponding to the determined quantity $X_j$(this quantity consisting of data on the lithology, the porosity, or the mobility), and this result being obtained in addition to the previously determined constant coefficient $\beta_j$ stored in the memory M.

A clock H simultaneously controls the logarithmic decoders 137 and 146 and the addressing circuit 173, thus allowing for the successive storing in the memory M of the quantities X corresponding to the lithology and to the porosity of the logged formations. The clock H also controls two gates 174 and 175 which connect respectively the function generators $GF_7$ and $GF_8$ with the amplifier 169 by way of the conductors 176 and 177 solely during the determination of the quantity $X_j$ corresponding to the mobility (or to the permeability of the surveyed formations.

The memory M is connected to a recording device and/or to a display device of the determined quantities $X_j$, and this device (not shown in the figure) may be of any known type (magnetic recording, recording on punched tape, etc.)

It is additionally possible to utilize a hybrid computer having a system arrangement identical to that described with reference to FIG. 6, in which the two coefficients $\alpha_{(n+3)j}$ and $\alpha_{(n+4)j}$ necessary for determining the permeability are stored in the memory $\alpha$.

Modifications may be applied to the present invention without departing from the spirit and scope thereof. For example, it is possible to use only the data delivered by the acoustic device of the sonde illustrated in FIG. 7, particularly in order to determine the permeability of the nonclay content geological formations.

We Claim:

1. A process for determining the characteristics of the geological formations traversed by a bore hole, making use of a measuring sonde in combination with an automatic system for the treatment of the data delivered by the sonde, comprising the combination of the following steps:

a. determining the spectrum of the $\gamma$ rays naturally radiated from the geological formations in the form of a plurality of quantities associated to said radiation, each of which depends on the intensity of this natural radiation, in a given energy range, b. alternately transmitting acoustic waves which propagate essentially according to the longitudinal way of propagation and acoustic waves having essentially a transversal way of propagation, c. successively determining the travel time of said longitudinal waves and of said transversal waves between two receivers placed in contact with the geological formations, by producing two quantities which are functions of the respective travel times of said longitudinal waves and transversal waves, d. successively determining, between said receivers, the attenuation of said longitudinal and of said transversal waves, by producing two quantities representative of said attenuation respectively for the longitudinal waves and for the transversal waves, and e. elaborating, on the basis of said quantities, in said automatic system, at least one resulting quantity, representative of a characteristic of said formations, by linearly combining said quantities associated to the $\gamma$ radiation with said quantities which are functions of the travel time of the longitudinal and transversal waves and with said quantities representative of the attenuations of said acoustic waves.

2. A process for determining the characteristics of the geological formations traversed by a bore hole, comprising the combination of the following steps:

a. determining the spectrum of the natural $\gamma$ rays radiated from the geological formations in the form of a plurality of signals associated to said radiation, each of which depends on the intensity of this natural radiation in a given energy range, b. alternately transmitting acoustic waves propagating in the geological formations essentially according to the longitudinal way of propagation and acoustic waves propagating essentially according to the transversal way of propagation, c. successively determining the travel time of said longitudinal waves and of said transversal waves between two receivers placed in contact with the geological formation, by producing two signals related to the respective travel times of the longitudinal waves and the transversal waves, d. successively determining between said receivers, the attenuation of said longitudinal waves and of said transversal waves, by producing two signals representative of said attenuation respectively for the longitudinal waves and for the transversal waves, e. recording said signals, and f. elaborating, on the basis of said recorded signals, at least one resulting signal, representative of a characteristic of said formations, by linearly combining said signals associated to the $\gamma$ radiation with said signals related to the travel time of said longitudinal and transversal waves, and with said signals representative of the attenuation of said acoustic waves.

3. A device for determining the characteristics of the geological formations traversed by a bore hole, comprising a sonde connected to a surface apparatus through a cable provided with electric conductors, said sonde comprising the combination of:

a. means for detecting the natural $\gamma$ radiation transmitted from the formations, said means delivering electric signals representative of the radiation emanating from the geological formations, b. means for transmitting acoustic waves, adapted to transmit to the geological formations, acoustic waves having essentially a longitudinal way of propagation, c. means for transmitting acoustic waves, adapted to transmit to the geological formations, acoustic waves having essentially a transversal way of propagation, d. means for alternately operating said first and second transmitting means, e. at least two acoustic wave receivers spaced vertically, adapted to deliver electric signals at the time of reception of said acoustic waves, f. means for determining the travel time and the waves attenuation between said receivers of said acoustic waves, said means being connected to said receivers and adapted to deliver a first series of electric signals representative of the travel time and a second series of electric signals representative of the attenuation of said acoustic waves, and g. means for transmitting to the surface all these electric signals.

4. A device according to claim 3, wherein said first and said second transmitting means transmit acoustic waves of a high frequency and said acoustic waves transmitted from said first transmitting means have a frequency different from that of the acoustic waves transmitted from said second transmitting means.

5. A device according to claim 3, wherein said first transmitting means are adapted to transmit acoustic waves whose frequency is at least 20 kHz.

6. A device according to claim 3, wherein said first transmitting means are adapted to transmit acoustic waves whose frequency is in the range of from 20 kHz to 80 kHz.

7. A device according to claim 3, wherein said transmitting means are adapted to transmit acoustic waves whose frequency is at least 80 kHz.

8. A device according to claim 3, wherein said second transmitting means are adapted to transmit acoustic waves whose frequency is in the range of from 80 kHz to 250 kHz.

9. A device according to claim 3, wherein said first and second transmitting means are operating alternately at a recurrence frequency between 5 and 100 Hz.

10. A device according to claim 9, wherein said recurrence frequency is about 50 Hz.

11. A device according to claim 3, wherein said first transmitting means, said second transmitting means and said receivers are placed in the same diametral plane of the sonde.

12. A device according to claim 3, wherein said first transmitting means consist of an acoustic transmitter of the magnetostrictive type.

13. A device according to claim 3, wherein said second transmitting means consist of an acoustic transmitter of the piezo-electric type.

14. A device according to claim 3, wherein said sonde is provided with a movable pad for supporting and for positioning said means for detecting the $\gamma$ radiation emanating from the geological formations, said second acoustic waves transmitting means and said receivers are supported on the same movable pad of the sonde, so as to come into contact with the wall of the bore hole along a generatrix thereof.

15. A device according to claim 3, wherein said receivers are at a distance from one another equal to a few times the wave length of the transmitted acoustic waves and the distance between said receivers and second acoustic waves transmitting means is greater than ten wave lengths of the transmitted acoustic waves.

16. A device according to claim 3, wherein said means for measuring the attenuation of the acoustic waves comprise a first blocking-lengthening element connected to a first of said receivers, a second blocking-lengthening element connected to the second of said receivers, each of said elements delivering an electric signal of predetermined duration having an amplitude substantially proportional to the peak amplitude of a predetermined half cycle of the electric signals supplied by said receivers, this device also comprising a first analogical gate, a first amplifier and a polarity inverter, said polarity inverter connecting the first element on the one hand, to said first analogical gate and, on the other hand, to said amplifier delivering an electrical signal in the form of a rectangular wave of substantially constant amplitude and of the same duration as that of the signal delivered by said first blocking-lengthening element, a gate of the AND type having a first input connected to said first amplifier, the device further comprising a second analogical gate and a second amplifier said second element being connected, on the one hand, directly to said second analogical gate and, on the other hand, to said second amplifier delivering an electric signal in the form of a rectangular wave of substantially constant amplitude having the same duration than the signal delivered by said second blocking-lengthening element, said second AND gate having a second input connected to said amplifier, said AND gate being connected to said first and second analogical gates and supplying thereto a control signal when it simultaneously receives the signals delivered by each one of said first and second amplifiers, said analogical gates giving passage to the signals supplied by the blocking-lengthening elements only at the time of reception of said control signal, logarithmic amplifiers respectively connected to said first and second analogical gates and delivering signals substantially proportional to the logarithms of the amplitude of the signals supplied by said blocking-lengthening element, a summing amplifier having an input connected to said logarithmic amplifiers said summing amplifier delivering at its output terminal a signal the amplitude of which is substantially proportional to the logarithm of the ratio of the amplitudes of the electric signals supplied by said blocking-lengthening elements, and transmitting means connected to said summing amplifier, said transmitting means comprising a pulse lengthener, adapted to calibrate to a predetermined value the duration of the pulses supplied by said summing amplifier.

17. A device according to claim 16, wherein each of said blockinglengthening elements delivers a signal substantially proportional to the peak amplitude of one of the first five half-cycles of the electric signal delivered by each receiver.

18. A device according to claim 17, wherein each of said blockinglengthening elements delivers a signal substantially proportional to the peak amplitude of the first half-cycle of the electric signal delivered by each receiver.

19. A device according to claim 3, wherein said means for measuring the travel time of the acoustic waves comprises a first one-shot multivibrator connected to said first receiver and a second one-shot multivibrator connected to said second receiver, each of said multivibrators being adapted, when receiving a signal supplied by said receivers, to deliver, at its output terminal, a signal of calibrated amplitude and duration, said first multivibrator being connected to a first and a second gate of the AND type, said second multivibrator being connected to a device which, when it receives a signal supplied by said second multivibrator, delivers at one of its outputs at said second gate a signal identical to the received signal and delivers at its second output terminal connected to said first gate, an electric signal only in the absence of signal delivered by said second multivibrator, said first gate delivering a control signal of a duration equal to the time interval during which signals are simultaneously received at its input terminals, this time interval being substantially equal to the travel time of the acoustic waves between the two receivers, said control signal actuating over its whole duration, an analogical gate connecting to a voltage source, a time-amplitude conversion device, the output of which is connected to amplifying means delivering a signal whose amplitude is proportional to said travel time, said amplifying means being connected, through an analogical gate, controlled by the signal delivered by said second AND gate, to transmitting means comprising a device for lengthening the signal delivered by said amplifying means and a device for resetting to zero said time-amplitude conversion device actuated by the output signal of said second AND gate.

20. A device according to claim 3, wherein the surface apparatus comprises means for recording all the signals delivered by the sonde and means for elaborating in real time from said signals at least one resulting signal representative of a characteristic of said formations, said means for elaborating being connected to said means for recording and linearly combining said signals associated to the $\gamma$ radiation, said signals being a function of the travel time of the longitudinal and transversal acoustic waves and said signals being representative of the attenuations of said acoustic waves.

21. A device according to claim 20, wherein said means for elaborating in real time comprise a first memory wherein are recorded, in the form of signals, predetermined coefficients, a second memory wherein are recorded said group of signals delivered by the sonde, a group of means for treating said signals, connected to each of said memories actuated by a clock to which they are connected, said means being adapted to combine the signals of said group and to deliver, at their output terminal, at least one digital signal function of the received signals and representative of an information element concerning a characteristic of the geological formations, and a third memory, connected to said treating means, where is recorded said representative signal.

22. A process for *quantitatively* determining [the characteristics] *at least one of a lithological and petrophysical characteristic* of the geological formations traversed by a borehole, utilizing a measuring sonde which delivers signals, and an automatic system for treating the signals delivered by the sonde, said process comprising the steps of:

a. determining values of coefficients depending on the characteristics of the geological formations and registering the values of the coefficients in the automatic system, b. determining the spectrum of the $\gamma$ rays naturally radiated from the geological formations in the form of a plurality of quantities associated to said radiation, each of which depends on the intensity of this natural radiation in a given predetermined energy range of the spectrum, and c. elaborating on the basis of said quantities in said automatic system at least one resulting quantity representative of a characteristic of said formation by linearly combining said quantities as a function of the values of said coefficients.

[23. A device for determining the characteristics of the geological formations traversed by a borehole, comprising a measuring sonde placed in the borehole and delivering electrical signals, a surface apparatus combined with said sonde for the automatic treatment of the signals delivered by the sonde, said surface apparatus comprising means for registering values of coefficients depending on the characteristics of the geological formations a cable having electrical conductors, said sonde comprising:

a. means for detecting the natural $\gamma$ radiation emitted by the formations, and for producing electrical signals representative of the $\gamma$ radiation emitted by the geological formations each of the signals being a function of the intensity of the natural radiation within a given predetermined energy range of the spectrum, and b. means for transmitting the electrical signals to the surface apparatus.]

24. A device for *quantitatively* determining [the characteristics] *at least one of a lithological and petrophysical characteristic* of the geological formations traversed by a borehole, comprising a measuring sonde placed in the borehole and delivering electrical signals, a surface apparatus combined with said sonde for the automatic treatment of the signals delivered by the sonde, values of coefficients depending on the characteristics of the geological formations being registered in the automatic system, a cable having electrical conductors, said sonde comprising:

a. means for detecting the natural $\gamma$ radiation emitted by the formations and for producing electrical signals representative of the $\gamma$ radiation emitted by the geological formations, each of the signals being a function of the intensity of the natural radiation within a given predetermined energy range of the spectrum, and b. means for transmitting the electrical signals to the surface apparatus, and wherein the surface apparatus comprises means for recording said electrical signals delivered by and transmitted form said sonde, and means for elaborating in real time from said electrical signals at least one resulting signal representative of a characteristic of said formations, said means for elaborating being connected to said recording means and linearly combining said electrical signals associated to the $\gamma$ radiation.

25. A device according to claim 24, wherein said means for elaborating in real time comprises [flat] *first* memory means to which predetermined coefficients are supplied and are recorded therein in the form of signals, second memory means in which said signals delivered by the sonde are recorded, clock means delivering a clock signal and connected to said first and second memory means, combining means connected to said first and second memory means and responsive to a clock signal for combining the signals from said first and second memory means and providing at least one digital resultant signal which is representative of an information element concerning a characteristic of the geological formations, and third memory means connected to said combining means for recording said representative resultant signal.

26. A process for *quantitatively* determining [the characteristics] *at least one of a lithological and petrophysical characteristic* of the geological formations traversed by a borehole, using a combination a measuring sonde which delivers signals and an automatic system for treating the signals delivered by the sonde, said process comprising the steps of:

a. determining values of coefficients depending on the characteristics of the geological formations and registering the values of the coefficients, b. determining the spectrum of the natural $\gamma$ rays radiated from the geological formations in the form of a plurality of signals associated to said radiation, each of which depends on the intensity of this natural radiation in a given predetermined energy range of the spectrum, c. recording said signals, and d. elaborating on the basis of said signals in said automatic system, at least one resulting signal representative of a characteristic of said formation by linearly combining said signals as a function of the values of said coefficients.

27. A process for *quantitatively* determining [characteristics] *at least one of a lithological and petrophysical characteristic* of a geological formation traversed by a borehole, utilizing a measuring sonde including means delivering measuring signals, and a data processing system for treating said measuring signals, this process comprising the steps of:

a. determining from said measuring signals a plurality of quantities associated to the natural $\gamma$ radiation of the geological formations, each of said quantities depending on the intensity of said natural radiation in a given predetermined energy range of the spectrum, b. determining the values of *calibration* coefficients [depending on at least one characteristic of the geological formation], and c. elaborating through said data processing system, on the basis of said measured quantities and of said coefficients, a [plurality of] resulting [quantities] *quantity* representative of said at least one characteristic of said formation, said resulting [quantities] *quantity* being derived from said measuring quantities through [a plurality of] *at least one* linear [relationships] *relationship* including a plurality of coefficients having said values determined in step (b).

*28. A process according to claim 26 wherein the values of the coefficients determined in step (b) depend on at least one lithology characteristic.*

*29. A process according to claim 28, wherein the at least one lithology characteristic includes the clay content of the geological formation.*

*30. A process for determining the clay content of a geological formation traversed by a borehole, utilizing a measuring sonde including means delivering measuring signals, and a data processing system for treating said measuring signals, this process comprising the steps of:*

*(a) determining from said measuring signals a plurality of quantities associated to the natural $\gamma$ radiation of the geological formations, each of said quantities depending on the intensity of said natural radiation in a given predetermined energy range of the spectrum,*

*(b) determining the values of calibration coefficients, and*

*(c) elaborating through said data processing system, on the basis of said measured quantities and of said coefficients, resulting quantity representative of the clay content of said formation, said resulting quantity being derived from said measured quantities through a linear relationship including a plurality of coefficients having said values determined in step (b).*

*31. A process according to claim 30, wherein said plurality of quantities determined in step (a) depend on the intensity of the natural radiation in a plurality of substantially contiguous energy ranges of the $\gamma$ radiation spectrum.*

* * * * *